UNITED STATES PATENT OFFICE.

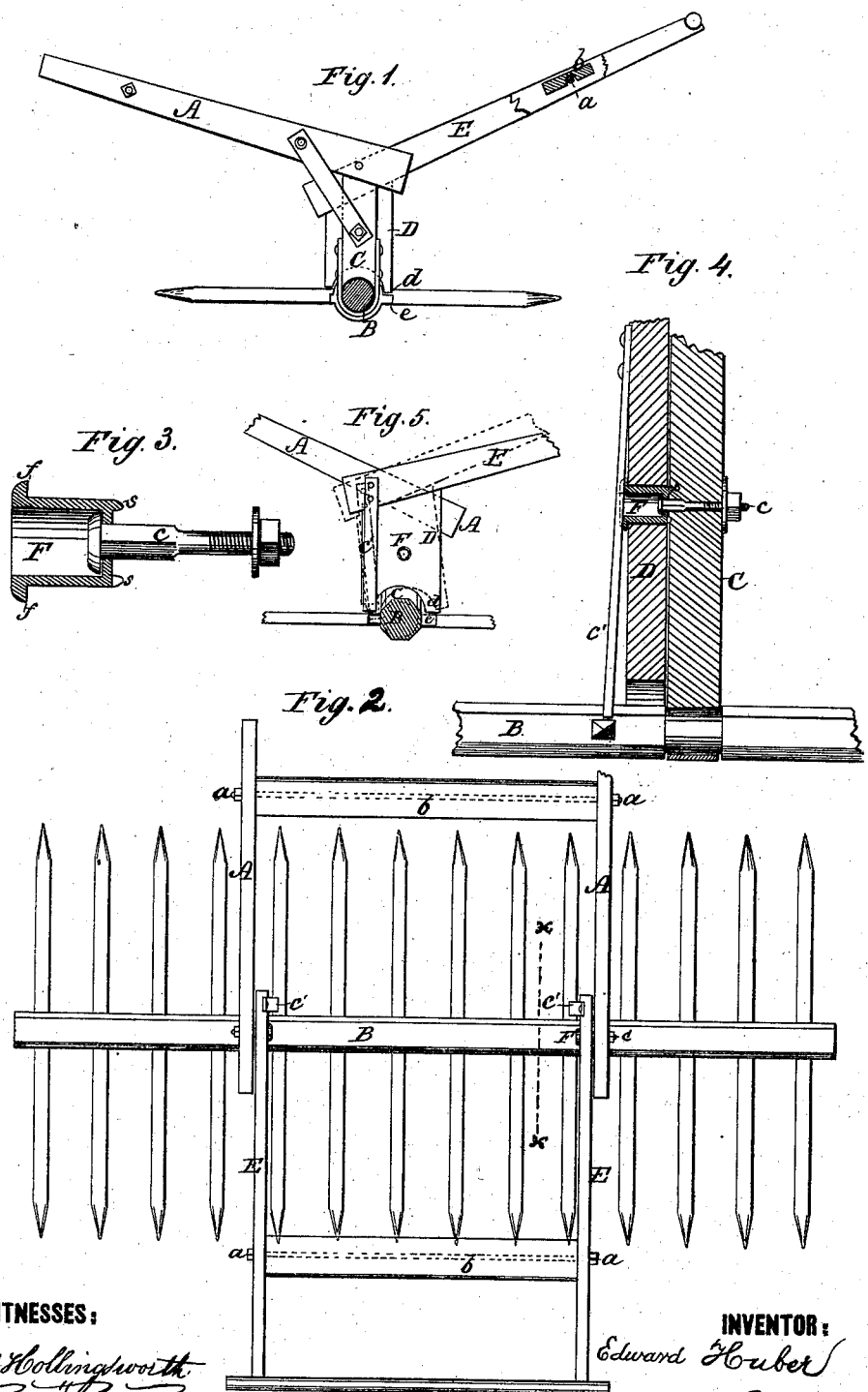

EDWARD HUBER, OF MARION, OHIO.

IMPROVEMENT IN HORSE HAY-RAKES.

Specification forming part of Letters Patent No. 194,435, dated August 21, 1877; application filed June 8, 1877.

*To all whom it may concern:*

Be it known that I, EDWARD HUBER, of the city and county of Marion and State of Ohio, have invented a new and useful Improvement in Revolving Horse Hay-Rakes; and I do hereby declare that the following is a full, clear, and exact description of the same.

The invention is an improvement in the class of revolving horse hay-rakes, and relates to the construction of the pivot-bolts which connect the pendants of the handle and draft-bars.

In the accompanying drawings, forming part of this specification, Figure 1 is an end elevation of the rake, with part in section. Fig. 2 is a plan view of the rake. Fig. 3 is an enlarged detail section of the device for connecting the pendants of the handle and draft-bar. Fig. 4 is an enlarged detail section of the pendants of the draft and handle bars, showing the arrangement and application of the device for connecting them. Fig. 5 is a cross-section on line $x\ x$, Fig. 2.

The draft-bars A are attached to the rake-head B by means of pendants or arms C, in the usual way, and their front ends are rigidly connected by a tie-rod, $a$, and spacing-bar $b$, the latter having a groove in its under side in which the rod is placed, as shown. The broad pendants or arms D of handle-bars E are pivoted to the pendants C by means of thimbles F and short bolts $c$. The thimbles have circular flanges $f$ on their outer ends, and spurs $s$ on their inner ends, Fig. 3. The flanges $f$ bear against the side of the handle-pendants D, and the spurs $s$ enter the side of the pendants C of the draft-bars. The bolts $c$ pass through the bottom or inner ends of the thimbles, and also through the pendants C. The bolts $c$ draw the spurs $s$ into the wood, and the spurs, in turn, prevent the thimbles revolving on the bolts. The latter, being slender, do not unduly weaken the narrow pendants C, while the larger thimbles furnish a broad bearing for the wide pendants D.

The rake is prevented from revolving by the spring-catches $c'$, which are attached vertically to the front ends of handles E, and bear on the front tines or teeth; and also by the rear shoulders $d$, Fig. 1, of the pendants D, which bear on the rear lugs $e$ located between the teeth. The rake is revolved by raising the rear ends of handle-bars.

What I claim is—

The combination, with the pendants C and D, of the pivots, formed of the flanged thimbles having spurs $s$ and the bolts $b$, all as shown and described.

EDWARD HUBER.

Witnesses:
W. E. MOORE,
B. F. STAHL.